United States Patent

Ling et al.

[11] Patent Number: 5,761,993
[45] Date of Patent: Jun. 9, 1998

[54] JUICE-EXTRACTOR ALSO SERVING AS A GRINDER

[76] Inventors: Kuo-I Ling, 9F, No. 12, Alley 31, Che Lu To Street; Rong-Yuan Tseng, 10F, No. 3, Lane 65, Chung Hsiao Rd., both of San Chorng City, Taipei Hsien, Taiwan

[21] Appl. No.: 911,024

[22] Filed: Aug. 14, 1997

[51] Int. Cl.⁶ .............. A23N 1/00; A23N 1/02; A23L 1/212; B02C 7/12
[52] U.S. Cl. .............. 99/510; 99/495; 99/513; 99/286; 241/37.5; 241/92; 241/261; 241/261.1
[58] Field of Search .............. 99/286, 495, 509–513, 99/574–576; 241/260.1, 261, 261.1, 261.3, 273.2, 92, 37.5, 101.1, 101.2; 100/98 R, 134, 213; 366/83–85, 272, 297, 314

[56] References Cited

U.S. PATENT DOCUMENTS

| | | | |
|---|---|---|---|
| 3,533,563 | 10/1970 | Eriksson | 241/261 |
| 3,799,522 | 3/1974 | Loomans | 366/85 |
| 4,025,056 | 5/1977 | Miles et al. | 366/272 |
| 4,073,013 | 2/1978 | Blach | 366/601 |
| 4,506,601 | 3/1985 | Ramirez et al. | 99/513 |
| 4,613,086 | 9/1986 | Granum et al. | 241/261.1 |
| 4,874,136 | 10/1989 | Webster | 241/261 |
| 4,924,770 | 5/1990 | Raub | 99/510 |
| 5,031,522 | 7/1991 | Birixel et al. | 99/511 |
| 5,193,448 | 3/1993 | Antonio | 99/512 |
| 5,353,697 | 10/1994 | Venturati et al. | 99/492 |
| 5,433,144 | 7/1995 | Lee | 99/513 |
| 5,452,650 | 9/1995 | Lee | 99/510 |

*Primary Examiner*—Timothy F. Simone
*Attorney, Agent, or Firm*—Morton J. Rosenberg; David I. Klein; Jun Y. Lee

[57] ABSTRACT

A juice-extractor also serving as a grinder suitable for extracting juice from water-containing materials, such as vegetables, fruits, soybeans, and for grinding dry material into powder, such as coffee beans, green beans, nuts. In addition to elements similar to that of a juice-extractor, such as the funnel, the top cover, the lower grinding disc, the meshes-containing filter, the residue collector, the juice flow guider, and the base, the grinder also includes a bag made of air-pervious fabric and a rotational retainer having a closed side wall. When the juice-extractor is to serve as a grinder to grind a dry material into powder, the air-pervious bag is used to replace the residue collector and the rotaional retainer is used to replace the meshes-containing filter, so that powder produced from the grinding can be directly sent into the bag instead of the juice flow guider.

4 Claims, 6 Drawing Sheets

JUICE-EXTRACTOR ALSO SERVING AS A GRINDER

BACKGROUND OF THE INVENTION

The juice-extractor has been a popular family appliance for many years. A housewife may use the juice-extractor to extract juice from various kinds of vegetable and fruit and use the extracted juice to make many home-made foods, such as bean milk, sugarcane juice, carrot juice. However, such conventional juice-extractor can only be used to grind or extract juice from materials containing water. In case of grinding a dry material, water must be added to permit safe grinding operation. That is, the conventional juice-extractor can not be used to grind a material in a completely dry condition, such as to grind coffee beans to obtain powdered coffee.

Some people who enjoy coffee might request a coffee seller to grind coffee beans for them and store the fresh coffee powder at home for their own use. However, the ground coffee tends to easily lose it good smell and taste and even become deteriorated after being stored for a period of time. The deteriorated coffee surely has bad influence on the drinker's health. To avoid the risk of deteriorated coffee, some people might prefer to buy a coffee grinder to grind the coffee beans at home at any time they want to enjoy a cup of fresh coffee. An additional coffee grinder will, of course, increase the family expenditure and occupy extra space to store it.

Therefore, it is desirable to improve the conventional juice-extractor which is very popular among general families so that the juice-extractor can also be used to grind coffee beans and other dry material simply by adding a few elements which are suitable for collecting powder obtained from gound dry material.

SUMMARY OF THE INVENTION

The present invention relates to a juice-extractor which can also serve as a grinder when a rotational retainer and a cloth bag are used to respectively replace a filter and a residue collector which are used in a conventional juice-extractor. When the present invention serves as a grinder, it can be used to grind dry material. Powder obtained from the ground material can be collected in the cloth bag tightened to one side of a top cover of the grinder. What is to be noted is the cloth bag is made of air-pervious material and therefore allows good air convection in the grinder during the grinding. Good air convection shall facilitate collection of the powder into the bag. After the grinding is completed, the cloth bag can be easily removed from the top cover to take out the powder.

BRIEF DESCRIPTION OF THE DRAWINGS

The structure and functions of the present invention can be best understood by referring to the following detailed description of the preferred embodiment and the accompanying drawings, wherein.

DETAILED DESCRIPTION OF THE PREFERRED EMBODIMENTS

Figure 1:
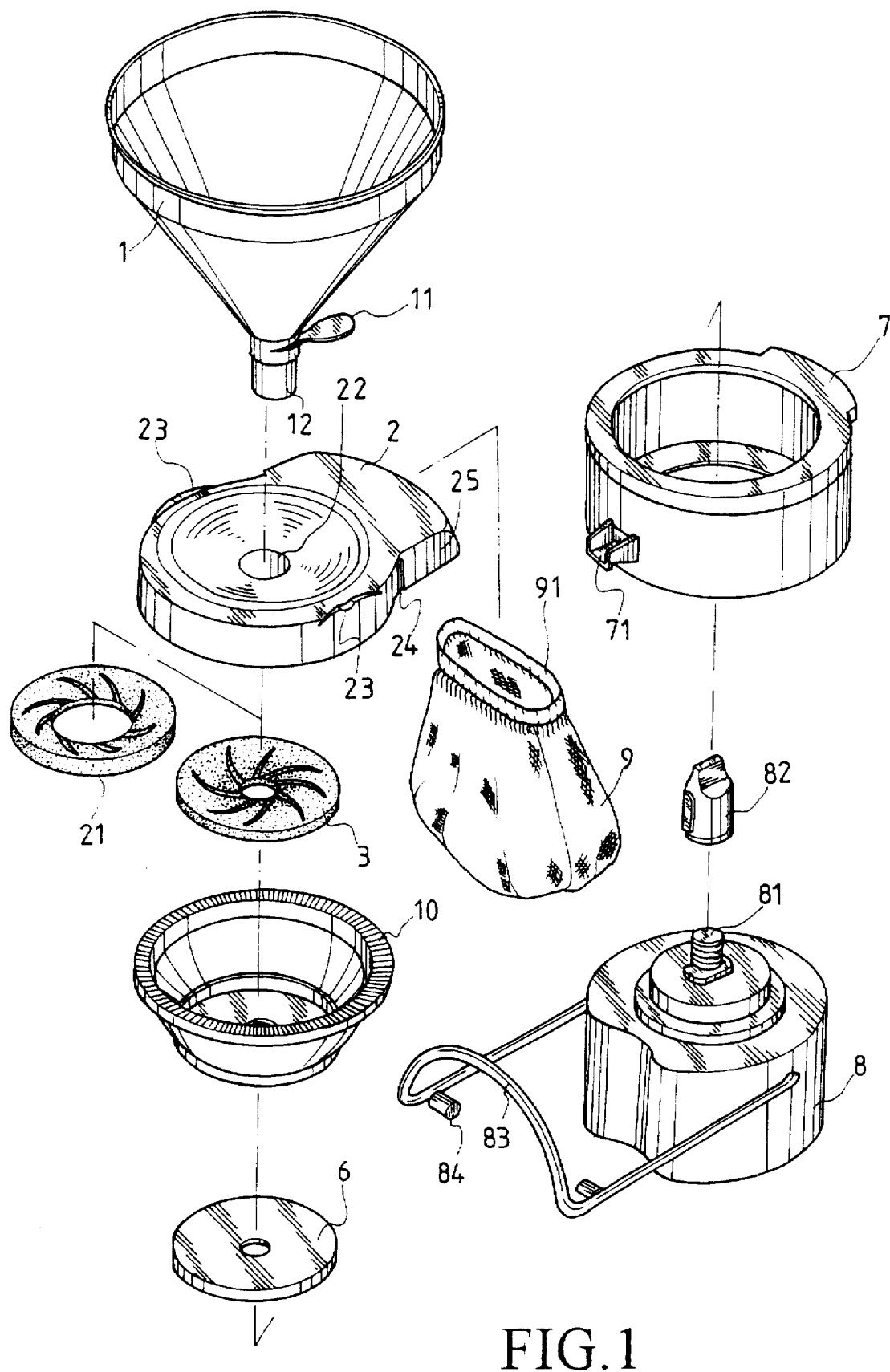
FIG. 1 is an exploded perspective of the present invention.

The present invention relates to a juice-extractor also serving as a grinder. Since the present invention adopts a structure of a conventional juice-extractor as its basic structure, the structure of the conventional juice-extractor and the operation thereof is first described herein. For convenience purpose, in the description of the structures of the conventional juice-extractor and of the present invention, like elements will be denoted by the same reference numerals. However, it is understood that various changes in the shape, size, and arrangements of such elements may be achieved by those who are skilled in the art without departing from the spirit of the invention or the scope of the subjoined claims.

Figure 3:
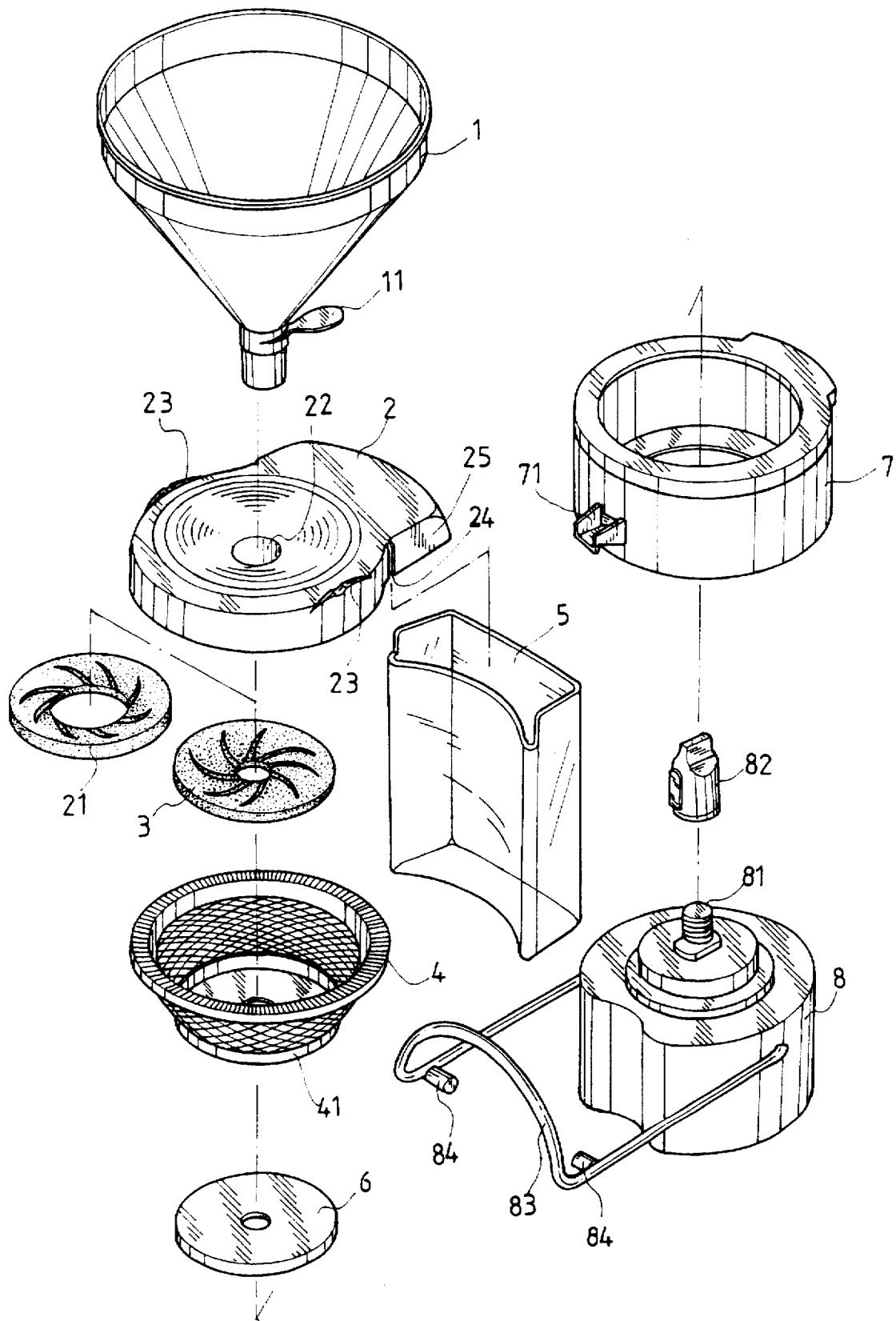
FIG. 3 is an exploded perspective of a conventional juice-extractor.
Figure 4:
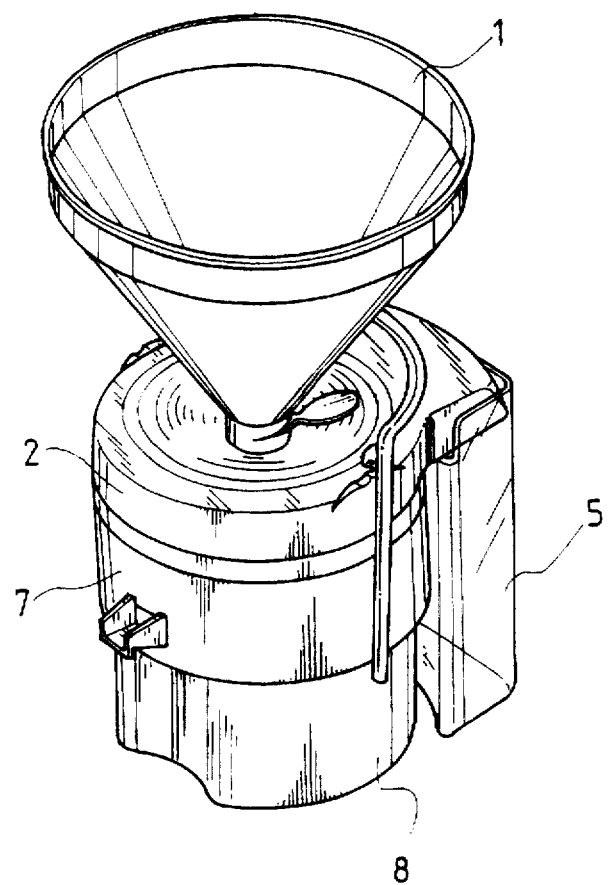
FIG. 4 is an assembled perspective of the conventional juice-extractor of FIG. 3.

Please now refer to FIGS. 3 and 4 in which a conventional juice-extrator forming the basis of the present invention is shown. The juice-extractor includes, from top to bottom, a funnel 1, a top cover 2, an upper grinding disc 21 attached to a bottom surface of the top cover 2, a lower grinding disc 3 disposed below and cooperating with the upper grinding disc 21, a filter 4 having a central hole and holding the lower grinding disc 3 therein, and a bottom disc 6. The lower grinding disc 3, the filter 4, and the bottom disc 6 all are disposed in a juice flow guider 7 and are fixedly mounted onto a shaft 81 of a base 8 by means of a screw cap 82.

The funnel 1 accepts material to be ground and has a lower mouth 12 which is inserted into a central opening 22 of the top cover 2. A push tab 11 is provided near a bottom of the funnel 1 above the lower mouth 12 to control a flow of the material to be sent into the juice-extractor for grinding.

The top cover 2 includes an extension 25 laterally projected from one side of the top cover 2. A residue collector 5 is disposed below the extension 25 for collecting residues separated from the extracted juice. Retaining means 23 are provided at two sides of the top cover 2 at predetermined positions.

The filter 4 is provided at its side wall with meshes 41, so that juice extracted from the ground material can be filtered by and flow through the meshes 41 into the juice flow guider 7 and finally flows out the juice-extractor from an outlet 71 of the juice flow guider 7.

A motor (not shown) is mounted inside the base 8 to rotate the shaft 81 of the base 8. The rotating shaft 81 further brings the lower grinding disc 3, etc. to rotate. To enable all the elements of the juice-extractor to firmly associate with one another, a fixing bar 83 having two inward projected retaining heads is pivotally connected to the base 8, so that the fixing bar 83 can be turned upward to firmly bind all elements together with the retaining heads 83 caught in the retaining means 23 on the top cover 2.

When using the above described juice-extractor to obtain some kind of juice, put some water-containing material in the funnel 1 and turn on the motor in the base 8. After the water-containing material is ground in the juice-extractor, juice produced from the ground material is discharged from the outlet 71 of the juice flow guider 7. Residues produced from the ground material and separated from the juice by the filter 4 is discharged from the extension 25 of the top cover 2 under a centrifugal force produced by the rotating shaft 81 of the base 8. The discharged resuidues are collected in the via the outlet 71 of the juice flow guider 7 can be directly served or be stored for later use.

Figure 2:
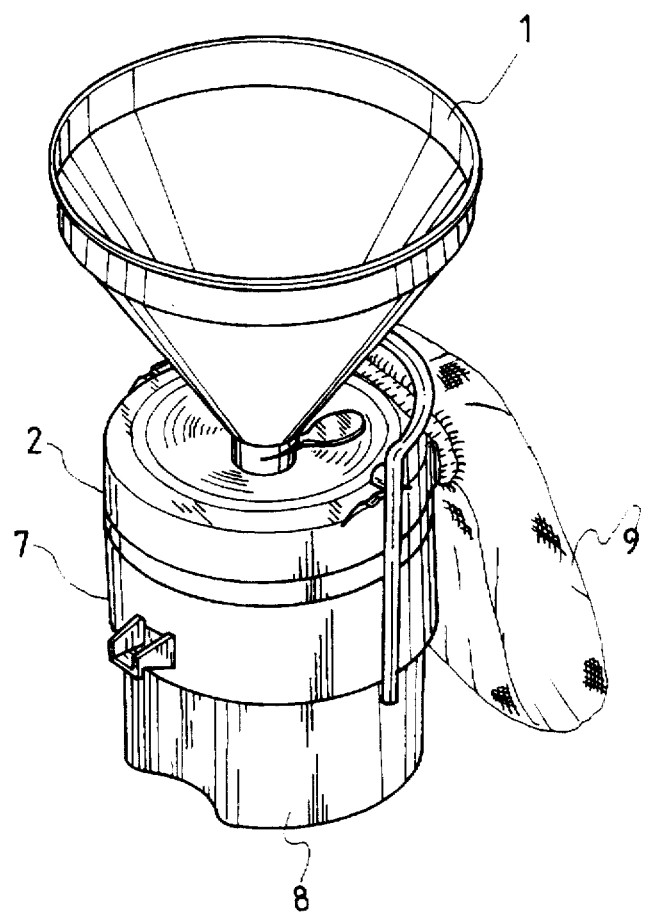
FIG. 2 is an assembled perspective of the present invention.

What is to be noted is the above described juice-extractor can only be used to grind water-containing material to extract juice from the material, and it can not be used to grind a dry material into powder. To overcome this drawback, the present invention provides a juice-extractor which can also serve as a grinder for dry material as shown in FIGS. 1 and 2.

The present invention has similar structure as that of the above described conventional juice-extractor. However, two vertical grooves 24 are provided on two sides of the top cover 2 at where the top cover 2 projects to form the extension 25. A bag 9 made of air-pervious cloth and having an elastic band 91 sewed to an opening of the bag is additionally provided for directly engaging into the two grooves 24 and tightening around the extension 25, so that the bag 9 firmly attaches to and hangs from the extension 25. Meanwhile, a rotational retainer 10 with closed side wall is used to replace the meshes-containing filter 4 to dispose below the lower grinding disc 3.

When using the present invention to grind a dry material, such as coffee beans and green beans, simply pour the dry material into the funnel 1, allowing the dry material to continuously flows into the present invention for grinding. Since the rotational retainer 10 has closed side wall without any mesh or hole, the dry material having been ground into powder will be sent directly into the bag 9 due to a centrifugal force produced when the motor 8 is started. And since the bag 9 is made of air-pervious fabric, it allows good air convection in the present invention during a grinding operation, and therefore permits resultant powder to be continuously and smoothly collected into the bag 9.

It is to be understood that the bag 9 can also be made of other material depending on the actual need, as long as the material is air-pervious while it can effectively hold the powder without any leakage.

Figure 5:
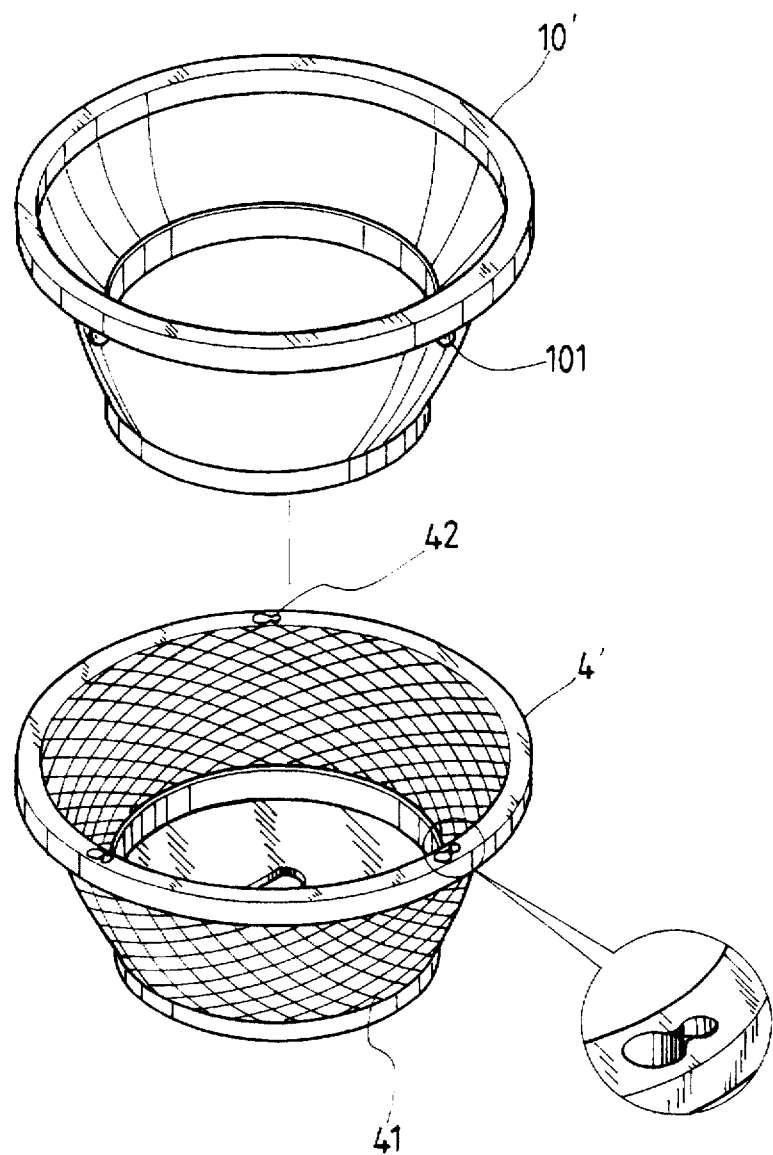
FIG. 5 illustrates a second embodiment of the rotational
Figure 6A:
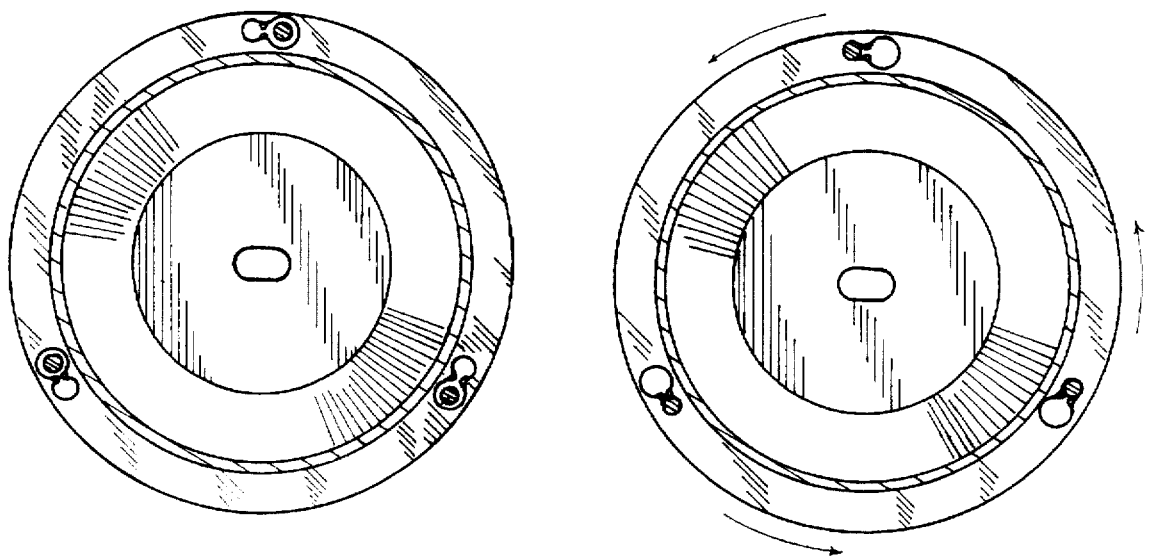
FIGS. 6A and 6B illustrate the manner in which the filter and the rotational retainer of FIG. 5 is assembled.
Figure 6B:
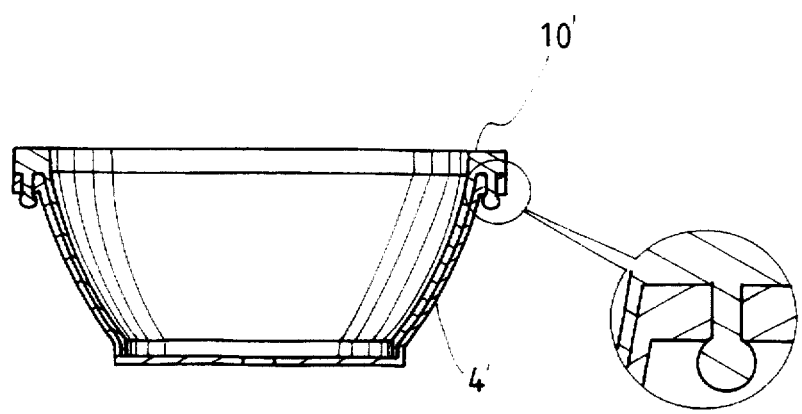

FIGS. 5, 6A and 6B illustrate a second embodiment of the filter 4' and the rotational retainer 10'. Wherein, the rotational retainer 10' has only a side wall without a bottom. Protuberances 101 are provided at a bottom side of a flange extending around an upper circumferential edge of the retainer 10'. And, receiving holes 42 having a profile of a figure "8" are provided at a top side of a flange extending around an upper circumferential edge of the filter 4' to correspond to the protuberances 101 on the rotational retainer 10'. The receiving hole 42 each includes a larger and a smaller circular opening with a narrowed neck portion formed between the two circular openings. The rotational retainer 10' is nested in the filter 4' with the protuberances 101 downward extending into the larger circular openings of the receiving holes 42. Then, the rotational retainer 10' is rotated in a direction as indicated by the arrows in FIG. 6A, so that the protuberances 101 are forced to slide into the smaller circular openings of the receiving holes 42. Since the protuberance 101 each has an outer diameter the same as an internal diameter of the smaller circular opening and is pressed against the smaller circular opening by the narrowed neck portion, the rotational retainer 10' can be firmly attached to the filter 4' without easily becoming loose from the filter 4'.

Since the present invention has a structure fully compatible with that of the conventional juice-extractor, a consumer already having a conventional juice-extractor may purchase only the additional rotational retainer 10 and bag 9 for use with the old juice-extractor.

With the above arrangements, the present invention provides improvements to the conventional juice-extractor for water-containing material so that the juice-extractor can also serve as a grinder for dry material.

What is claimed is:

1. A juice-extractor also serving as a grinder, comprising a funnel, a top cover, a lower grinding disc, a filter, a residue collector, a bottom disc, a juice flow guider, a base, a bag, and a rotational retainer; said funnel having a bottom mouth inserted into a central hole of said top cover, said top cover having an upper grinding disc attached to a bottom side thereof to work with said lower grinding disc to grind material put into said funnel, said upper and said lower grinding discs being located in said filter or said rotational retainer, if one is used when grinding a dry material, and said grinding discs and said filter or said retainer all being fixedly mounted around a shaft of said base by means of a screw cap; said bag having a top opening with an elastic fastening means provided therearound, so that said bag can be tightened to said top cover at a predetermined location; and said rotational retainer having a closed side wall and an upward expanded opening to hold said lower grinding disc therein while said rotational retainer being disposed in said juice flow guider and being fixed to said shaft of said base by said screw cap; whereby when a dry material is ground into powder by said upper and said lower grinding discs, said powder is sent to and collected by said bag instead of being sent to said juice flow guider.

2. A juice-extractor also serving as a grinder as claimed in claim 1, wherein said bag is made of air-pervious fabric.

3. A juice-extractor also serving as a grinder as claimed in claim 1, wherein said elastic fastening means around said opening of said bag is an elastic band.

4. A juice-extractor also serving as a grinder as claimed in claim 1, wherein said rotational retainer has only side wall without a bottom and has downward extended protuberances provided at a bottom side of a top flange; and wherein said filter is provided at a top side of a top flange with receiving holes corresponding to said protuberances on said rotational retainer, so that said rotational retainer can be nested in and associated with said filter by engagement of said protuberance into said receiving holes to perform a grinding of a dry material.

* * * * *